(12) United States Patent
Pfeiffer et al.

(10) Patent No.: US 11,841,272 B2
(45) Date of Patent: Dec. 12, 2023

(54) METHOD FOR ADAPTING A LAB SETPOINT COLOR VALUE OF MULTICOLORED PRINTED PRODUCTS

(71) Applicant: Heidelberger Druckmaschinen AG, Heidelberg (DE)

(72) Inventors: Nikolaus Pfeiffer, Heidelberg (DE); Stefan Schenk, Wiesenbach (DE); Bernd Utter, Schriesheim (DE); Michael Hansen, Kiel (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 18/159,194

(22) Filed: Jan. 25, 2023

(65) Prior Publication Data
US 2023/0236064 A1 Jul. 27, 2023

(30) Foreign Application Priority Data
Jan. 25, 2022 (DE) ...................... 10 2022 101 631.5

(51) Int. Cl.
*H04N 1/54* (2006.01)
*G01J 3/46* (2006.01)

(52) U.S. Cl.
CPC ............... *G01J 3/463* (2013.01); *G01J 3/462* (2013.01); *H04N 1/54* (2013.01)

(58) Field of Classification Search
CPC .... G01J 3/46; G01J 3/504; G01J 3/501; G01J 3/463; G01J 2003/503
See application file for complete search history.

(56) References Cited

U.S. PATENT DOCUMENTS

| 7,032,517 B2 | 4/2006 | Bestmann |
| 8,371,221 B2 | 2/2013 | Krabbenhoeft |
| 8,654,395 B2 | 2/2014 | Bestmann |
| 10,397,413 B2 | 8/2019 | Eggert et al. |
| 2012/0327433 A1* | 12/2012 | Edge .................... H04N 1/6061 358/1.9 |

(Continued)

FOREIGN PATENT DOCUMENTS

| DE | 10223479 A1 | 1/2003 |
| DE | 102004001937 A1 | 8/2005 |

(Continued)

*Primary Examiner* — Maurice C Smith
(74) *Attorney, Agent, or Firm* — Laurence A. Greenberg; Werner H. Stemer; Ralph E. Locher

(57) ABSTRACT

A method of adapting a Lab setpoint color value of multi-colored printed products, wherein a special color is replaced by process colors using an ICC color profile. A measurement point that is assigned to the replaced special color on the printed product is metrologically acquired using a color measuring system and a Lab actual color value of the measurement point is calculated. The ICC color profile or a standardized ICC color profile is used for computing the color composition of the Lab setpoint color value from the participating process colors. Changes of the layer thicknesses of the participating process colors are ascertained to achieve a predetermined Lab setpoint color value of the measurement point using a digital tool or a digital model. The participating process colors are adapted using the ascertained changes of their layer thicknesses.

16 Claims, 2 Drawing Sheets

(56) References Cited

U.S. PATENT DOCUMENTS

| | | | | |
|---|---|---|---|---|
| 2014/0226150 A1* | 8/2014 | Colonna de Lega | ........................ G01B 9/02087 356/73 |
| 2016/0004941 A1* | 1/2016 | Bestmann | ................ H04N 1/54 358/3.21 |
| 2016/0360072 A1* | 12/2016 | Inamura | ............... H04N 1/6041 |
| 2020/0410310 A1* | 12/2020 | Morovic | .............. G06K 15/102 |

FOREIGN PATENT DOCUMENTS

| | | |
|---|---|---|
| DE | 102006025898 A1 | 12/2007 |
| DE | 102006040609 A1 | 3/2008 |
| DE | 102010009226 A1 | 9/2010 |
| DE | 102010007858 A1 | 8/2011 |
| DE | 102015204956 A1 | 11/2015 |
| DE | 102014010061 A1 | 1/2016 |
| DE | 102018202453 A1 | 9/2018 |
| DE | 102021104841 A1 | 9/2021 |
| JP | 2019016924 A * | 1/2019 |
| WO | WO-2015161895 A1 * | 10/2015 ................ B41J 2/21 |

* cited by examiner

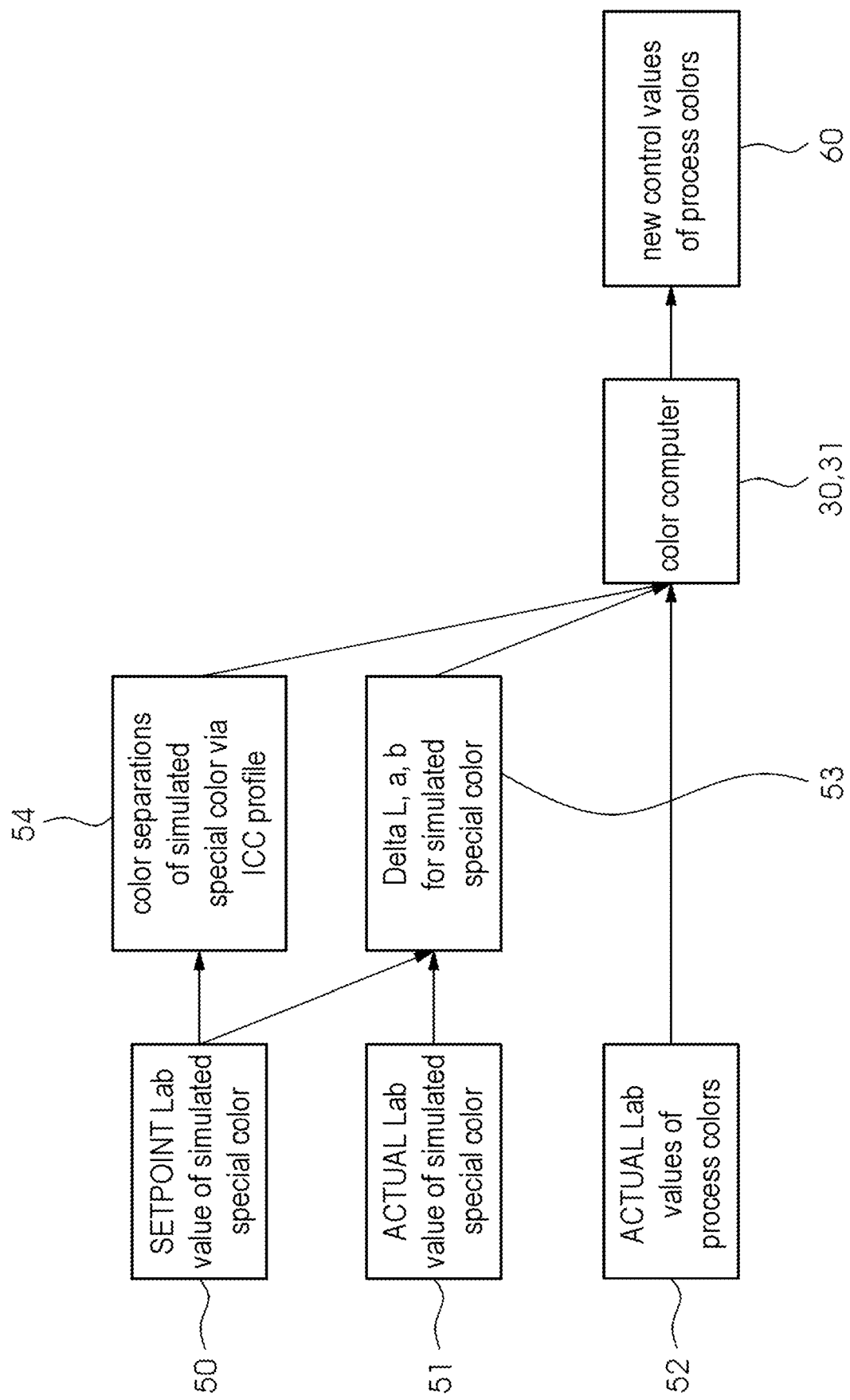

METHOD FOR ADAPTING A LAB SETPOINT COLOR VALUE OF MULTICOLORED PRINTED PRODUCTS

CROSS-REFERENCE TO RELATED APPLICATION

This application claims the priority, under 35 U.S.C. § 119, of German Patent Application DE 10 2022 101 631.5, filed Jan. 25, 2022; the prior application is herewith incorporated by reference in its entirety.

FIELD AND BACKGROUND OF THE INVENTION

The invention relates to a method for adapting a Lab setpoint color value of multicolored printed products, wherein at least one special color is replaced by process colors using an ICC color profile, specifically by a combination of at least two process colors participating in the replacement.

The invention is in the technical field of the graphics industry and in particular therein in the field of the automatic closed-loop control (regulation) of the printing color(s) or their layer thicknesses on a printing material, specifically in the case of special colors replaced by process colors. The invention can be used in offset printing, i.e., in indirect flat printing on printing materials such as paper, cardboard, or plastic film.

In multicolored printing, for example, in printing using seven colors (CMYK RGB or CMYK OGV), special colors can be replaced by the process colors. It is important here to match the special color well and maintain it over the volume of the printing job, or the circulation volume.

There are already several documents in the prior art which disclose how special colors can be theoretically replaced by process colors and thus can be optimally printed theoretically. Reference is had, for example, to the following published patent applications DE 10 2014 010 061 A1 (cf. US 2016/0004941 A1), DE 10 2004 001 937 A1 (cf. U.S. Pat. No. 7,032,517 B2), DE 10 2015 204 956 A1, DE 102 23 479A1, and DE 10 2010 007 858 A1 (U.S. Pat. No. 8,654,395 B2). However, the disclosed methods are not optimum in practice, since the layer thickness(es) vary during printing, i.e., deviate from the optimum. German published patent application DE 10 2021 104 841 A1 furthermore discloses a method which is executed manually by the operator and is therefore complex and slow to carry out and is possibly also susceptible to error.

The installation of measurement fields for replaced special colors in print control strips is complex and therefore not very advantageous, since for this purpose other measurement fields have to be output in the print control strip, an individual print control strip has to be created, and a measuring device has to "know" its structure. Measurement in the image does appear more advantageous, but is also linked to disadvantages, since it is only possible outside the printing press, i.e., off-line, without an in-line measuring device. Moreover, none of the afore-mentioned cases take into consideration the present ICC profile.

SUMMARY OF THE INVENTION

It is therefore an object of the present invention to provide an improvement over the prior art which in particular enables optimized color regulation to be carried out for at least one replaced special color.

With the above and other objects in view there is provided, in accordance with the invention, a method of adapting a Lab setpoint color value of multicolored printed products where at least one special color is replaced with the use of an ICC color profile by a combination of at least two process colors participating in the replacement. The method comprises the following steps:

metrologically acquiring by a color measuring system at least one measurement point on the printed product that is assigned to the replaced special color and ascertaining therefrom a Lab actual color value of the measurement point by a computer;

using the ICC color profile or a matching standardized ICC color profile for a computer determination of a color composition of a Lab setpoint color value from the participating process colors;

ascertaining layer thicknesses of the participating process colors to achieve a predetermined Lab setpoint color value of the measurement point using a digital tool or a digital model; and adapting at least the participating process colors using the ascertained changes of the layer thicknesses of the participating process colors.

In other words, the method according to the invention is for adapting a Lab setpoint color value of multicolored printed products, wherein at least one special color is replaced by process colors using an ICC color profile, specifically by a combination of at least two process colors participating in the replacement, is distinguished in that at least one measurement point—assigned to the replaced special color—on the printed product is metrologically acquired (i.e., measured) using a color measuring system and a Lab actual color value of the measurement point is ascertained therefrom by computer, the ICC color profile or a standardized ICC color profile selected as matching thereto is used for the computer determination of the color composition of the Lab setpoint color value from the participating process colors, changes of the layer thicknesses of the participating process colors are ascertained to achieve a predetermined Lab setpoint color value of the measurement point using a digital tool or a digital model, and an adaptation of at least the participating process colors is carried out using the ascertained changes of their layer thicknesses.

The invention advantageously enables optimized color regulation (i.e., optimized closed-loop color control) to be carried out for at least one replaced special color. A replaced special color, for example, a customer-specific purple, is not printed as a real special color, rather instead at least two replacement process colors are printed and the special color is composed of the replacement process colors. The purple is composed, for example, of the process colors cyan, magenta, and black.

The digital tool can be a so-called color adaptation tool or profiling tool for adapting an ICC color profile to changing process colors. The changing process colors are, for 7C printing, for example: Cyan, Magenta, Yellow, Black, Red, Green, Blue, or CMYK RGB.

The color structure of the measurement point can be ascertained from the measured actual value via the ICC profile used. The required layer thickness changes of the participating process colors are then determined either via a physical model (for example, Neugebauer model) or a so-called profiling tool and preferably displayed or transmitted to the printing press for color control.

A specific example can comprise one or more of the following steps:

Placing measurement fields, for example mini spots, in the free area but close to the object on the printed sheet, for example, by means of the system "Prinect" of Heidelberger Druckmaschinen AG.

Transmitting position and setpoint color value to a color measuring system.

Transmitting the ICC profile used to the color measuring system.

Measuring color actual value and comparing it to setpoint color value; calculating and possibly displaying the color distance.

Based on the setpoint color value and the ICC profile used, the structure of the measured measurement field (for example CMYK OVG) is determined.

Preferably, only the colors are taken into consideration for the color regulation, the color proportion of which is greater than 10%.

Alternative a (preferred variant): via a profiling tool, the process colors are changed in the layer thickness so that the color location of the measurement field corresponds to the setpoint color location;

Alternative b: The required layer thickness changes are calculated directly via Neugebauer and/or layer thickness model.

If multiple measurement fields are to be matched, in the case of overdetermination of the system, an optimization (for example weighted mean value or the root mean square of the color distances) is used as the target variable.

If fewer equations than unknowns are provided (there are three equations per measurement field), further optimization options can thus be used (minimum overall adjustment and/or minimum number of colors).

The calculated color deviations and the color differences achievable using the corrected colors are preferably displayed.

The color deviations are transmitted to the press and tracked.

The following paragraphs describe preferred refinements and advantageous developments of the invention.

In accordance with an advantageous feature of the invention it is possible, as an adaptation, to carry out a color regulation of at least the participating process colors using the ascertained changes of their layer thicknesses.

In accordance with an added feature of the invention, the color regulation (i.e., color control) is carried out by activating positioning motors of color zones.

In accordance with again added feature of the invention, five, six, or seven process colors are used.

The process colors may comprise the colors C, M, Y, and K and one, two, or three color/colors expanding the color space. In a further refinement, the three colors expanding the color space are the colors R, G, and B (red, green, blue). Also, the three colors expanding the color space may be the colors O, G, and V (orange, green, violet).

In accordance with another feature of the invention, the digital tool is a digital color adaptation tool for adapting an ICC color profile to changing process colors. It is a further refinement of the invention to provide the color adaptation tool as software.

The digital model may be a simulating model. Further, the simulating model may be a physical model (i.e., a model taking into consideration the relevant physics of participating media and components), in particular the Neugebauer model for layer thicknesses.

In accordance with a further feature of the invention, a measurement field or a mini spot is located at the measurement point.

In accordance with yet a further refinement of the invention, the location of the measurement point on the printed product is transmitted to the color measuring system. Preferably, the ICC color profile or the standardized ICC color profile that is selected as matching is transmitted to the color measuring system. The transmission may take place from the pre-press stage to the color measuring system.

In a further refinement, the Lab setpoint color value of the measurement point is transmitted to the color measuring system.

In accordance with yet an added feature of the invention, the Lab setpoint color value is used for the computer determination of the color composition of the Lab actual color value.

It is a further feature that the Lab actual color value of the measurement point is compared by computer to the predetermined Lab setpoint color value of the measurement point. A color distance between Lab actual color value and Lab setpoint color value is thereby ascertained by computer.

It is a further advantageous refinement that the layer thicknesses are changed of only those participating process colors which have a proportion in the color composition of the replaced special color and/or the measurement point of more than 10% each.

In accordance with again an added feature of the invention, multiple measurement points—each assigned to multiple replaced special colors—in the printed product are metrologically acquired using at least one color measuring system and Lab actual color values of the measurement points are ascertained therefrom by computer. Preferably, an optimization is thereby carried out by computer. A weighted mean value may be used in this context. It is possible to thereby use a root mean square of respective color distances between Lab actual color values and Lab setpoint color values.

It is a further advantageous refinement that the overall change of the layer thicknesses is minimized here. Preferably, also, the total number of the process colors to be changed with respect to their respective layer thickness is minimized here.

In accordance with again a further feature of the invention, the changes of the layer thicknesses and/or the ascertained color distance and/or an ascertained minimum achievable color distance are displayed to an operator on a display.

The color measuring system may be provided as an in-line system, i.e., to be integrated in a printing press. In the alternative, the color measuring system may be provided as an off-line system, i.e., as a system that is provided separately from a printing press.

The printed products, by way of example, may be produced for packaging.

Other features which are considered as characteristic for the invention are set forth in the appended claims.

The features and combinations of features disclosed in the above sections technical area, invention, and refinements and in the following section exemplary embodiments represent—in any combination with one another—further advantageous refinements of the invention.

Although the invention is illustrated and described herein as embodied in a method for adapting a Lab setpoint color value of multicolored printed products, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 2 shows the sequence of a preferred exemplary embodiment of the method according to the invention.

DETAILED DESCRIPTION OF THE INVENTION

Figure 1:
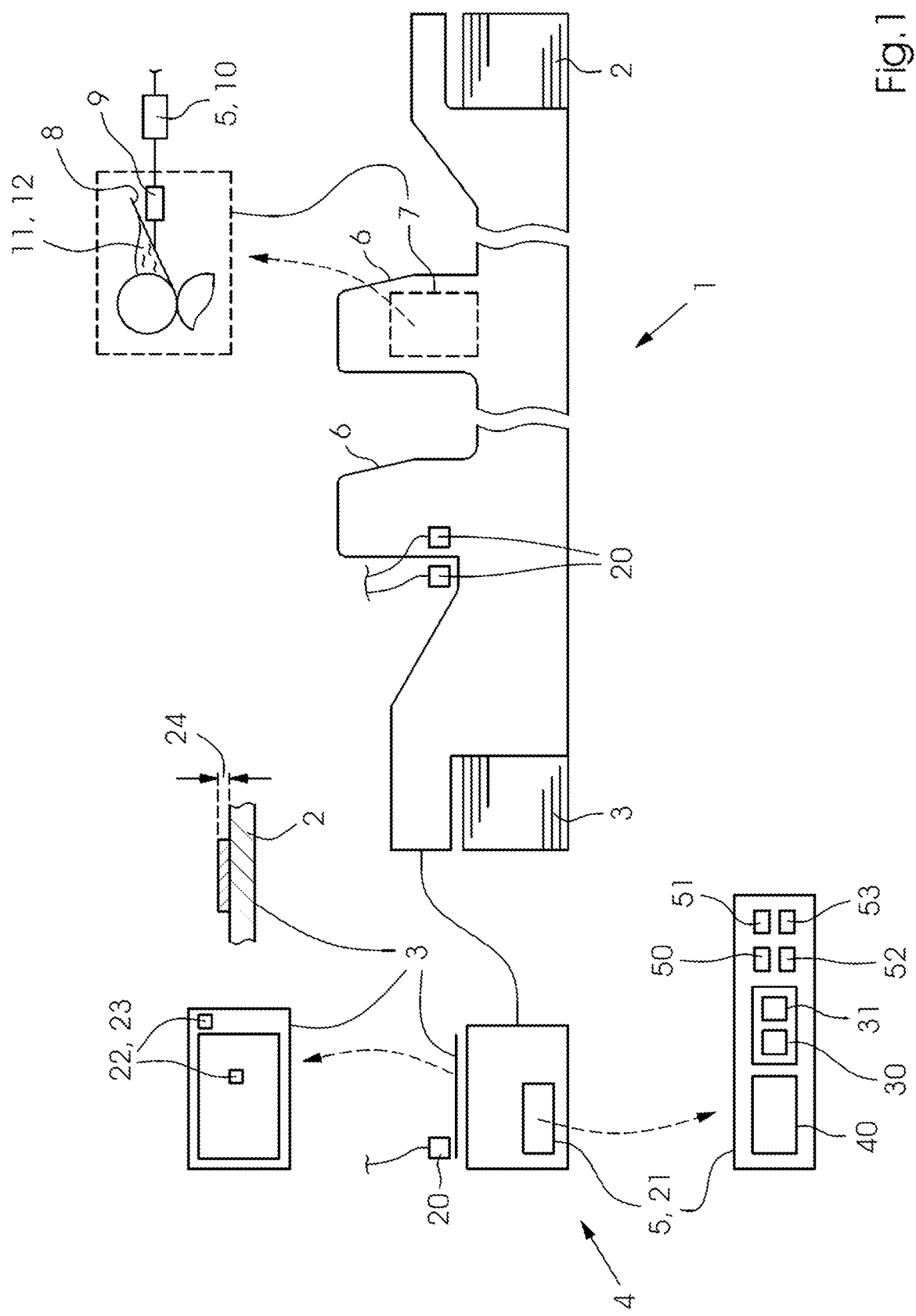
FIG. 1 shows a diagram illustrating a preferred exemplary embodiment of the method according to the invention and its preferred refinements or a device and its components as it is carried out.

Referring now to the figures of the drawing in detail and first, in particular, to FIG. 1 thereof, there is shown a printing press 1, for example, an offset printing press, for printing on printing material 2 or for producing printed products 3, e.g., from paper, cardboard, or plastic film. In addition, the figure shows a machine control center 4, via which, for example, presets can be performed on the printing press. The control center comprises a digital computer 5 for this purpose.

The printing press 1 comprises (between its feeders and delivery) a plurality of successively arranged printing units 6, including a last printing unit (before the delivery). The printing units each comprise an inking unit 7. One of the inking units is shown as an example and enlarged (see detail view). It comprises color zones 8 adjustable in a known manner for the zone setting of a color layer thickness 24 on the printing material 2 (see detail view). One positioning motor 9 is provided per color zone for the adjustment, which is supplied with positioning values by the computer 5 or a separate color regulator 10 (i.e., a closed-loop color controller 10). The inking unit can process one of the process colors C (cyan), M (magenta), Y (yellow), or K (black), or a special color (X).

The control center 4 comprises a color measuring system 20—preferably movable over the printed product 3 automatically or by hand in a known manner—for the spectral measurement of at least one measurement point 22 or one measurement field 23 at a measurement point on the printing material 2 (see detail view). The measurement field can be, for example, a so-called mini spot. The measurement point can be arranged in or adjacent a printed image, for example, in a print control strip. The printing material 2 or a printed product 3 can be "pulled" here at the output and laid on the control center (off-line measurement).

The measuring system 20 comprises a computer 21, which may be the same as the computer 5. The computer 21 and its memory or contents stored and/or processed therein is shown enlarged as an example (see detail view). The color measuring system 20 can alternatively or additionally also be provided in the last printing unit 6 or directly after it (in-line measurement). The respective color measuring system is connected to the computer 21 (or 5).

The method can be carried out as follows using the above-described components according to FIG. 2:

The printing press 1 is equipped with multiple printing plates for a print job and preset accordingly, partially executes the print job, and produces printed products 3. A closed-loop controlled color adjustment is to take place.

At least one measurement point 22 and/or a measurement field 23 on the measurement point for a replaced special color is acquired metrologically, for example spectrally, by means of the color measuring system 20 and transferred to a computer 21.

The digital computer 21 of the color measuring system or a computer connected thereto, for example, the computer 5, has a digital memory in which an ICC color profile 40 is stored. The special color is replaced by process colors 11 by means of this ICC profile.

The ICC color profile 40 (or a standardized ICC color profile 40 selected as matching thereto) is used for the computer determination of the color composition of the Lab setpoint color value 50 from the participating process colors 11. The setpoint color value 50 is preferably stored. Using the known ICC profile 40, the color separations of the replaced special color can thus be ascertained by computer, i.e., the proportions of the process colors that participate in the current replacement.

A Lab actual color value 51 of the measurement point 22 is ascertained by computer.

The color distance 53 of the replaced special color is ascertained by computer, i.e., the color distance of its actual color value 51 from its setpoint color value 50.

The actual color values of the process colors 52 can be acquired metrologically.

Changes of the layer thicknesses 24 of the participating process colors 11 are ascertained to achieve a predetermined setpoint color value 50 of the measurement point 22 using a color computer, i.e., a digital tool 30 or a digital model 31.

An adaptation or closed-loop control adjustment of at least the participating process colors 11 is carried out using the ascertained changes of their layer thicknesses 24.

All color locations, color values, and color distances can relate to the Lab color space.

The following is a summary list of reference numerals and the corresponding structure used in the above description of the invention:

1 printing press
2 printing material
3 printed product(s)
4 machine control center
5 computer
6 printing unit(s)
7 inking unit(s)
8 color zones
9 positioning motors
10 color regulator/color regulation (closed-loop control)
11 process color(s)
12 special color(s)
20 color measuring system
21 computer
22 measurement point(s) on the printed product
23 measurement field(s), in particular mini spot(s)
24 layer thickness(es)
30 digital tool
31 digital model
40 ICC profile
50 Lab setpoint color value(s) of the replaced special color(s)
51 Lab actual color value(s) of the replaced special color(s)
52 Lab actual color value(s) of the process color(s)
53 color distance
54 generation of the color separations
60 color regulation, closed-loop color control

The invention claimed is:

1. A method of adapting a Lab setpoint color value of multicolored printed products where at least one special color is replaced with the use of an ICC color profile by a combination of at least two process colors participating in the replacement, the method comprising:
   metrologically acquiring by a color measuring system at least one measurement point on the printed product that is assigned to the replaced special color and ascertaining therefrom a Lab actual color value of the measurement point by a computer;
   using the ICC color profile or a matching standardized ICC color profile for a computer determination of a color composition of a Lab setpoint color value from the participating process colors;
   ascertaining layer thicknesses of the participating process colors to achieve a predetermined Lab setpoint color value of the measurement point using a digital tool or a digital model; and
   adapting at least the participating process colors using the ascertained changes of the layer thicknesses of the participating process colors.

2. The method according to claim 1, wherein the adapting step comprises carrying out a closed-loop color control of at least the participating process colors using the ascertained changes of the layer thicknesses thereof.

3. The method according to claim 1, wherein the digital tool is a digital color adaptation tool for adapting an ICC color profile to changing process colors.

4. The method according to claim 1, wherein the digital model is a simulating model.

5. The method according to claim 4, wherein the simulating model is the Neugebauer model for layer thicknesses.

6. The method according to claim 1, which comprises transmitting the location of the measurement point on the printed product to the color measuring system.

7. The method according to claim 1, which comprises transmitting the ICC color profile or the standardized ICC color profile selected as matching to the color measuring system.

8. The method according to claim 1, which comprises transmitting the Lab setpoint color value of the measurement point to the color measuring system.

9. The method according to claim 8, which comprises using the Lab setpoint color value for calculating the color composition of the Lab actual color value.

10. The method according to claim 8, which comprises comparing the Lab actual color value of the measurement point by computer to the predetermined Lab setpoint color value of the measurement point.

11. The method according to claim 10, which comprises ascertaining by computing a color distance between Lab actual color value and Lab setpoint color value.

12. The method according to claim 1, which comprises changing the layer thicknesses of only those participating process colors which have a proportion in the color composition of at least one of the replaced special color or the measurement point of more than 10%.

13. The method according to claim 1, which comprises metrologically acquiring multiple measurement points, each assigned to multiple replaced special colors, in the printed product using at least one color measuring system, and calculating therefrom the Lab actual color values of the measurement points.

14. The method according to claim 13, which comprises carrying out an optimization by computerized calculation.

15. The method according to claim 14, which comprises minimizing an overall change of the layer thicknesses.

16. The method according to claim 14, which comprises minimizing a total number of the process colors to be changed with respect to their respective layer thickness.

* * * * *